US011847907B2

(12) United States Patent
Sakakibara et al.

(10) Patent No.: US 11,847,907 B2
(45) Date of Patent: Dec. 19, 2023

(54) TRAFFIC FLOW SIMULATOR, SIMULATION METHOD OF TRAFFIC FLOW, AND COMPUTER PROGRAM

(71) Applicants: SUMITOMO ELECTRIC INDUSTRIES, LTD., Osaka (JP); SUMITOMO ELECTRIC SYSTEM SOLUTIONS CO., LTD., Tokyo (JP)

(72) Inventors: Hajime Sakakibara, Osaka (JP); Hiroshi Matsumoto, Osaka (JP); Nobihiro Yamazaki, Osaka (JP); Arata Doi, Osaka (JP); Hirofumi Ogami, Tokyo (JP)

(73) Assignees: SUMITOMO ELECTRIC INDUSTRIES, LTD., Osaka (JP); SUMITOMO ELECTRIC SYSTEMS SOLUTIONS CO., LTD., Tokyo (JP)

( * ) Notice: Subject to any disclaimer, the term of this patent is extended or adjusted under 35 U.S.C. 154(b) by 533 days.

(21) Appl. No.: 17/263,929

(22) PCT Filed: Aug. 6, 2018

(86) PCT No.: PCT/JP2018/029424

§ 371 (c)(1),
(2) Date: Jan. 28, 2021

(87) PCT Pub. No.: WO2020/031236

PCT Pub. Date: Feb. 13, 2020

(65) Prior Publication Data

US 2021/0233394 A1 Jul. 29, 2021

(51) Int. Cl.
*G08G 1/01* (2006.01)
*G01C 21/00* (2006.01)

(52) U.S. Cl.
CPC ......... *G08G 1/0145* (2013.01); *G08G 1/0133* (2013.01); *G08G 1/0141* (2013.01)

(58) Field of Classification Search
CPC ............... G01G 1/0145; G01G 1/0133; G01G 1/0141; G01C 21/00
See application file for complete search history.

(56) References Cited

U.S. PATENT DOCUMENTS

| | | | | |
|---|---|---|---|---|
| 9,014,955 | B2 * | 4/2015 | Sakakibara | G08G 1/0141 701/118 |
| 10,139,245 | B2 * | 11/2018 | Adachi | B60L 15/2045 |

(Continued)

FOREIGN PATENT DOCUMENTS

| | | | |
|---|---|---|---|
| JP | 2007-164262 | A | 6/2007 |
| JP | 2010-044528 | A | 2/2010 |

(Continued)

*Primary Examiner* — Tan Q Nguyen
(74) *Attorney, Agent, or Firm* — Oliff PLC

(57) ABSTRACT

A traffic flow simulator configured to simulate a traffic flow of a plurality of simulation vehicles generated in a road network. The traffic flow simulator includes: a route selection unit configured to select a route for each of a plurality of the simulation vehicles in accordance with a predetermined route selection model; and an index calculation unit configured to calculate a traffic evaluation index of the road network by causing each of a plurality of the simulation vehicles to move on the road network in accordance with the route. The route selection unit records, into a storage unit, a first route selected during execution of a first mode below and a second route selected during execution of a second mode below, the first and second mode being a work mode in which the traffic flow is simulated under a first and second setting condition.

8 Claims, 9 Drawing Sheets

(56) References Cited

U.S. PATENT DOCUMENTS

| | | | | |
|---|---|---|---|---|
| 2008/0319639 | A1* | 12/2008 | Yamane .............. | G08G 1/0104<br>701/118 |
| 2014/0149029 | A1 | 5/2014 | Sakakibara et al. | |

FOREIGN PATENT DOCUMENTS

| | | | |
|---|---|---|---|
| JP | 2011-141836 | A | 7/2011 |
| JP | 2011-186746 | A | 9/2011 |
| JP | 2013-025545 | A | 2/2013 |
| JP | 2013-025546 | A | 2/2013 |
| JP | 2013-037633 | A | 2/2013 |
| JP | 2013-041313 | A | 2/2013 |
| JP | 2013-073492 | A | 4/2013 |
| JP | 2013-080272 | A | 5/2013 |

* cited by examiner

FIG. 3

[CONFIGURATION EXAMPLE OF REAL TRAVEL INFORMATION]

| ITEM | DATA CONTENT | DETAIL OF CONTENT |
|---|---|---|
| NODE INFORMATION | NUMBER OF EFFECTIVE DATA | NUMBER OF TRANSMITTED DATA |
| | NODE NUMBER 1 (NODE NUMBER, etc.) | YEAR/MONTH/DAY/HOUR/MINUTE/SECOND, NODE NUMBER 1 |
| | ~ | ~ |
| | NODE NUMBER n (NODE NUMBER, etc.) | YEAR/MONTH/DAY/HOUR/MINUTE/SECOND, NODE NUMBER n |
| LINK INFORMATION | NUMBER OF EFFECTIVE DATA | NUMBER OF TRANSMITTED DATA |
| | LINK NUMBER 1 (LINK NUMBER, etc.) | YEAR/MONTH/DAY/HOUR/MINUTE/SECOND, LINK NUMBER 1, TRAFFIC LANE NUMBER |
| | ~ | ~ |
| | LINK NUMBER n (LINK NUMBER, etc.) | YEAR/MONTH/DAY/HOUR/MINUTE/SECOND, LINK NUMBER n, TRAFFIC LANE NUMBER |
| POSITION INFORMATION | NUMBER OF PIECES OF INFORMATION | NUMBER OF TRANSMITTED DATA |
| | POSITION NUMBER 1 (LATITUDE, LONGITUDE, etc.) | YEAR/MONTH/DAY/HOUR/MINUTE/SECOND, LATITUDE, LONGITUDE, SPEED, ABSOLUTE HEADING |
| | ~ | ~ |
| | POSITION NUMBER n (LATITUDE, LONGITUDE, etc.) | YEAR/MONTH/DAY/HOUR/MINUTE/SECOND, LATITUDE, LONGITUDE, SPEED, ABSOLUTE HEADING |
| SIGNAL UNIT INFORMATION | NUMBER OF PIECES OF INFORMATION | NUMBER OF TRANSMITTED DATA |
| | SIGNAL UNIT INFORMATION | YEAR/MONTH/DAY/HOUR/MINUTE/SECOND, PASSED INTERSECTION, PHASE, STEP NUMBER |

FIG. 4

[OD TRAFFIC VOLUME]

DESTINATION

ORIGIN

| | A1 | A5 | A6 | A10 | A12 |
|---|---|---|---|---|---|
| A1 | | 40 | 70 | 100 | 200 |
| A5 | 35 | | 80 | 120 | 160 |
| A6 | 50 | 90 | | 30 | 40 |
| A10 | 130 | 150 | 20 | | 50 |
| A12 | 110 | 150 | 30 | 40 | |

TRAFFIC FLOW SIMULATOR, SIMULATION METHOD OF TRAFFIC FLOW, AND COMPUTER PROGRAM

TECHNICAL FIELD

The present invention relates to a traffic flow simulator, a simulation method of a traffic flow, and a computer program.

BACKGROUND ART

There are increasing expectations for traffic flow simulators serving as means that evaluate, in advance, influences on vehicular traffic posed by factors such as traffic restrictions and accidents and that display the evaluation result in an easily understandable manner. Therefore, various technologies have been developed (see PATENT LITERATURE 1 to 9, for example).

In a traffic flow simulator, various types of traffic information such as a traffic volume (e.g., OD traffic volume) including origin-destination information of travel of a vehicle, a traveling speed and acceleration/deceleration characteristics of a vehicle at a link, and the like, are handled as given data.

The OD traffic volume refers to a calculated traffic volume between an origin (departure place) and a destination (destination place) of a vehicle, and, for example, statistic survey data obtained from a statistical survey periodically conducted by a country or a local government, or the like, is used.

The traffic flow simulator includes in advance a movement model of a vehicle, i.e., a calculation formula simulating behaviors of a vehicle. When the above-described input data is applied to the calculation formula, the traffic flow simulator outputs a traffic evaluation index such as a congestion length or a trip time period in a road network, such as in a single intersection, a route, or an urban area, or an environment index such as carbon dioxide contained in exhaust gas.

CITATION LIST

Patent Literature

PATENT LITERATURE 1: Japanese Laid-Open Patent Publication No. 2011-141836

PATENT LITERATURE 2: Japanese Laid-Open Patent Publication No. 2011-186746

PATENT LITERATURE 3: Japanese Laid-Open Patent Publication No. 2013-25545

PATENT LITERATURE 4: Japanese Laid-Open Patent Publication No. 2013-25546

PATENT LITERATURE 5: Japanese Laid-Open Patent Publication No. 2013-41313

PATENT LITERATURE 6: Japanese Laid-Open Patent Publication No. 2013-73492

PATENT LITERATURE 7: Japanese Laid-Open Patent Publication No. 2013-37633

PATENT LITERATURE 8: Japanese Laid-Open Patent Publication No. 2013-80272

PATENT LITERATURE 9: US Patent Application Publication No. 2014/0149029

SUMMARY OF INVENTION (1) A device according to an aspect of the present disclosure is a traffic flow simulator configured to simulate a traffic flow of a plurality of simulation vehicles generated in a road network. The traffic flow simulator includes: a route selection unit configured to select a route for each of a plurality of the simulation vehicles in accordance with a predetermined route selection model; and an index calculation unit configured to calculate a traffic evaluation index of the road network by causing each of a plurality of the simulation vehicles to move on the road network in accordance with the route. The route selection unit records, into a storage unit, a first route selected during execution of a first mode below and a second route selected during execution of a second mode below, the first mode being a work mode in which the traffic flow is simulated under a first setting condition, the second mode being a work mode in which the traffic flow is simulated under a second setting condition.

(4) A method according to an aspect of the present disclosure is for simulating a traffic flow of a plurality of simulation vehicles generated in a road network. The method includes: a selection step of selecting a route for each of a plurality of the simulation vehicles in accordance with a predetermined route selection model; and a calculation step of calculating a traffic evaluation index of the road network by causing each of a plurality of the simulation vehicles to move on the road network in accordance with the route. The selection step includes a step of recording, into a storage unit, a first route selected during execution of the first mode above and a second route selected during execution of the second mode above.

(5) A program according to an aspect of the present disclosure is configured to cause a computer to function as a traffic simulator. The traffic simulator is configured to simulate a traffic flow of a plurality of simulation vehicles generated in a road network. The computer program is configured to cause the computer to function as: a route selection unit configured to select a route for each of a plurality of the simulation vehicles in accordance with a predetermined route selection model; and an index calculation unit configured to calculate a traffic evaluation index of the road network by causing each of the simulation vehicles to move on the road network in accordance with the route. The route selection unit records, into a storage unit, a first route selected during execution of the first mode above and a second route selected during execution of the second mode above.

BRIEF DESCRIPTION OF DRAWINGS

FIG. 3 is a diagram showing a data configuration of real travel information stored in a travel information database.

FIG. 4 is a traffic volume table showing an example of OD traffic volumes in a predetermined time frame.

DESCRIPTION OF EMBODIMENTS

Figure 1:
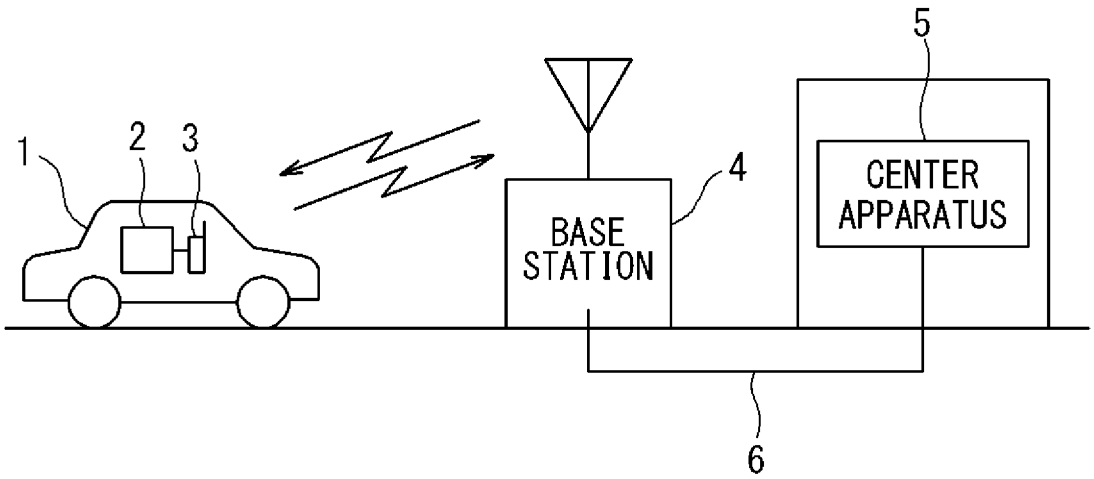
FIG. 1 is a schematic configuration diagram of a traffic information processing system according to a present embodiment.

Problems to be Solved by the Present Disclosure

A traffic flow simulator simulates a traffic flow of simulation vehicles on a road network, using, as a given condition, a predetermined setting information (e.g., traffic regulation, a position of a sporadically-occurring congestion, etc.) inputted by a user.

Therefore, even when a route selection model incorporated in the traffic flow simulator is the same, if a setting condition is changed, a different traffic evaluation index (e.g., link trip time period) is outputted.

However, in a case of a conventional traffic flow simulator, a selection result of a route for a simulation vehicle at each time point is not a target to be outputted, and is not stored in a storage unit. Therefore, the user cannot verify whether or not the same route selection model can be used as is even when a setting condition has been changed.

The present disclosure has been made in consideration of the above problem of the conventional art. An object of the present disclosure is to provide a traffic flow simulator or the like that allows the user to verify effectiveness of a route selection model.

Effects of the Present Disclosure

According to the present disclosure, the user can verify effectiveness of the route selection model.

Outline of Embodiment of the Present Disclosure

Hereinafter, the outline of the embodiment of the present disclosure will be described.

(1) A device according to the present embodiment is a traffic flow simulator configured to simulate a traffic flow of a plurality of simulation vehicles generated in a road network. The traffic flow simulator includes: a route selection unit configured to select a route for each of a plurality of the simulation vehicles in accordance with a predetermined route selection model; and an index calculation unit configured to calculate a traffic evaluation index of the road network by causing each of a plurality of the simulation vehicles to move on the road network in accordance with the route. The route selection unit records, into a storage unit, a first route selected during execution of a first mode below and a second route selected during execution of a second mode below, the first mode being a work mode in which the traffic flow is simulated under a first setting condition, the second mode being a work mode in which the traffic flow is simulated under a second setting condition.

According to the traffic flow simulator of the present embodiment, the route selection unit records, into the storage unit, the first route selected during execution of the first mode, and the second route selected during execution of the second mode.

Therefore, when the user contrasts the recorded first route and second route with each other, the user can determine whether or not the route selection model can be used in both of the first and second setting conditions, and thus, the user can verify effectiveness of the route selection model incorporated in the traffic flow simulator.

(2) Preferably, in the traffic flow simulator of the present embodiment, when an inequality below is established, the route selection unit sets, as the second route, a route calculated in accordance with the route selection model in the second mode, and when the inequality below is not established, the route selection unit sets the first route as the second route, $$C2+R<C1,$$

where

C1 is a cost of the first route,

C2 is a cost of the route calculated in the second mode, and

R is an adherence rate to the first route.

With this configuration, in accordance with the value of the adherence rate R, the degree at which the simulation vehicle changes the route in the second mode can be appropriately adjusted. Thus, simulation accuracy of the second mode can be improved.

(3) Preferably, in the traffic flow simulator of the present embodiment, when a real travelling vehicle of which an actual travel route is able to be specified is included in the simulation vehicles, the route selection unit adopts, in the first mode, with respect to a simulation vehicle designated as the real travelling vehicle, the travel route without performing the selection of the route based on the route selection model.

Accordingly, the actual travel route is included in the routes of simulation vehicles used in the first mode, and thus, simulation accuracy of the first mode can be improved.

(4) A method according to the present embodiment is a simulation method executed by the traffic flow simulator according to (1) to (3) described above.

Therefore, the simulation method of the present embodiment exhibits effects similar to those of the traffic flow simulator according to (1) to (3) described above.

(5) A program according to the present embodiment is a computer program for causing a computer to function as the traffic flow simulator according to (1) to (3) described above.

Therefore, the computer program of the present embodiment exhibits effects similar to those of the traffic flow simulator according to (1) to (3) described above.

Details of Embodiment of the Present Disclosure

Hereinafter, an embodiment of the present disclosure will be described in detail with reference to the drawings. At least some parts of the embodiment described below may be combined together as desired.

Definitions of Terms

In advance of describing the embodiment of the present disclosure, terms used in this specification are defined as follows.

The term "vehicle" refers to a general vehicle traveling on a road. Specifically, vehicles of the present embodiment include automobiles, motorized bicycles, light vehicles, and trolley buses, and further, motorcycles. The drive source of such a vehicle is not limited to an internal combustion engine.

Therefore, examples of the vehicle include ICEVs (internal combustion engine vehicles), EVs (electric vehicles), PHVs (plug-in hybrid vehicles), PHEVs (plug-in hybrid electric vehicles), etc.

The vehicle may be a "normal driving vehicle" that requires operation by an occupant, or an "automated driving vehicle" having a level of 4 or higher that does not require operation by an occupant.

The term "communication vehicle" refers to a vehicle capable of performing wireless communication with a roadside wireless device such as a base station. The communication vehicle may be either a normal driving vehicle or an automated driving vehicle. In the present embodiment, the simple term "vehicle" refers to both of a communication vehicle and a non-communication vehicle other than the communication vehicle.

The term "real travel information" refers to various types of information that is obtained from a communication vehicle actually traveling a road and that is for specifying a travel route of the vehicle. The real travel information includes "actually-performed travel information", which is past information, and "scheduled travel information", which is future information.

The term "actually-performed travel information" refers to various types of information that is obtained from a communication vehicle actually traveling a road and that is for specifying an actually-traveled route on which the vehicle travelled in the past. The actually-performed travel information includes vehicle ID, vehicle position, vehicle speed, vehicle heading, occurrence times of these, and the like, at a passing point of an actually-traveled route. The actually-performed travel information is referred to as probe data or floating car data.

Since the vehicle speed can be calculated if the vehicle position and the time are known, the actually-performed travel information only needs to include at least the vehicle position of a passing point of an actually-traveled route and an occurrence time.

The term "scheduled travel information" refers to various types of information that is obtained from a communication vehicle actually traveling a road and that is for specifying a scheduled route along which the vehicle is to travel in the future. The scheduled travel information includes vehicle ID, vehicle position, vehicle speed, vehicle heading, scheduled times of these, and the like, at a passing point of a scheduled route.

Since the vehicle speed can be calculated if the vehicle position and the time are known, the scheduled travel information only needs to include at least a vehicle position and a time.

The term "link" refers to a road section that connects nodes, which are predetermined points such as intersections, and that has inbound/outbound directions.

When viewed from an intersection, a link in a direction that flows in toward the intersection is referred to as an "inflow link". When viewed from an intersection, a link in a direction that flows out from the intersection is referred to as an "outflow link".

[Traffic Information Processing System]

FIG. 1 is a schematic configuration diagram of a traffic information processing system according to the present embodiment.

In the traffic information processing system of the present embodiment, a center apparatus 5 collects, from a communication vehicle 1, real travel information including a vehicle position and a passing time. The center apparatus 5 performs predetermined data processing by using the collected real travel information, and performs services of providing an occupant or the like of the communication vehicle 1 with traffic information such as a trip time period and a congestion state with respect to a predetermined road section (e.g., link).

As shown in FIG. 1, the traffic information processing system includes: an on-vehicle device 2 and a communication device 3 which are installed in a communication vehicle 1; and a wireless base station 4 and the center apparatus 5 which are installed on a roadside.

The communication vehicle 1 and the wireless base station 4 can perform wireless communication with each other. The wireless base station 4 and the center apparatus 5 can perform wired communication via a predetermined communication line 6. Communication between the wireless base station 4 and the center apparatus 5 may also be wireless communication.

The on-vehicle device 2 includes a vehicle speed sensor, a heading sensor, a GPS receiver, a navigation device, a memory, a time measuring device, and the like. Every predetermined time period or every predetermined distance, the on-vehicle device 2 collects data, such as the position of the communication vehicle 1, the time, and the like, that should be included in real travel information, and accumulates the collected data into the memory.

The communication device 3 is implemented as a wireless communication device such as a mobile phone or a smartphone installed in the communication vehicle 1. The communication device 3 is connected to the on-vehicle device 2. The communication device 3 can transmit the real travel information accumulated in the memory to the outside.

The scheduled travel information in the real travel information is generated by the navigation device of the on-vehicle device 2. Specifically, the navigation device executes a route searching process while using, as input information, the departure point and the destination point inputted by an occupant, and generates a scheduled route of the communication vehicle 1.

In addition, the navigation device generates data (scheduled travel information) including a passing position, a passing time, and the like of the scheduled route. The generated data is transmitted to the center apparatus 5 by the communication device 3 installed in the communication vehicle 1.

The wireless base station 4 transfers the real travel information received from the communication vehicle 1, to the center apparatus 5. The real travel information may be transmitted to the center apparatus 5 via a roadside device (not shown) such as an optical beacon or an ITS wireless device.

[Configuration Example of Center Apparatus]

Figure 2:
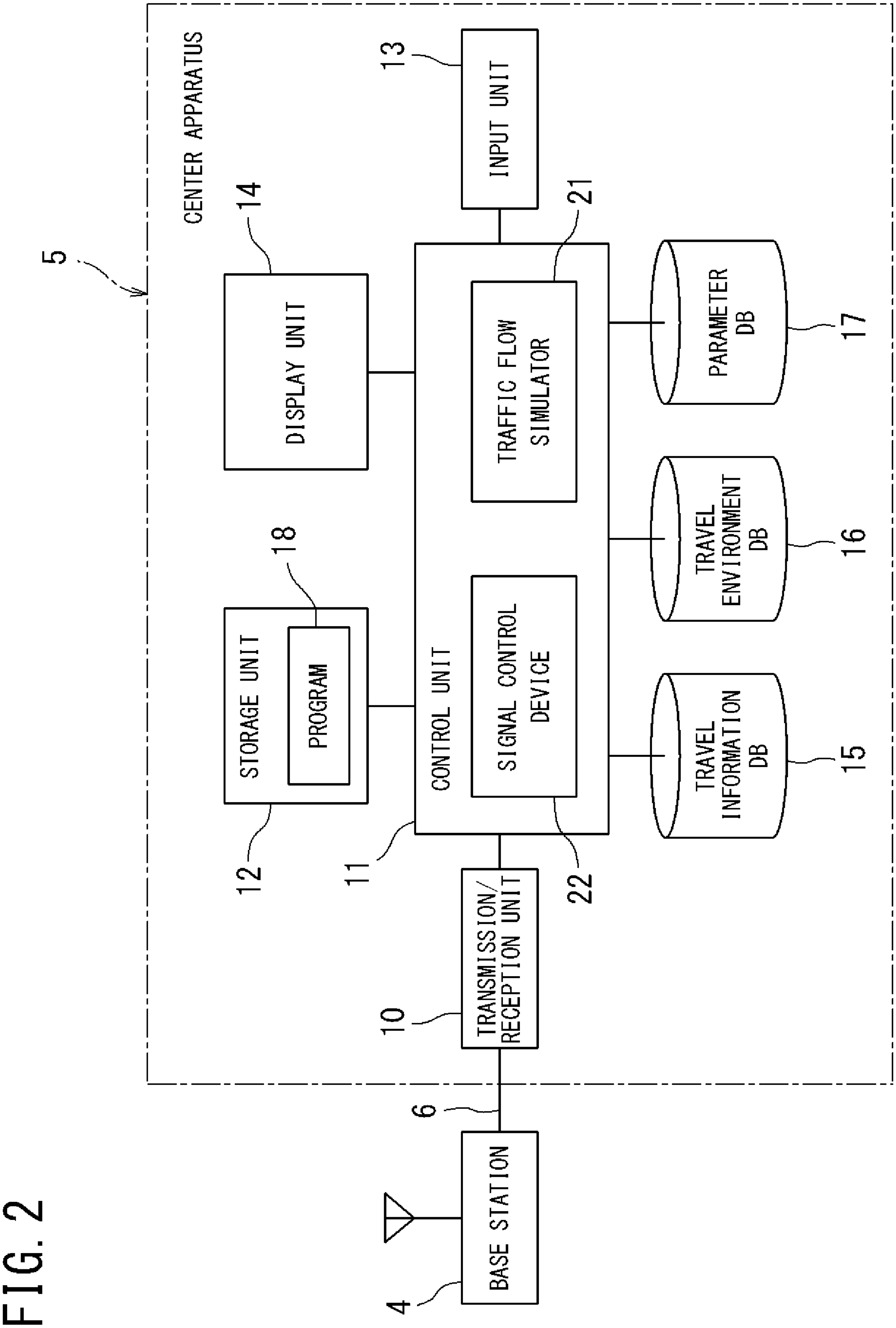
FIG. 2 is a block diagram showing a configuration example of a center apparatus.

FIG. 2 is a block diagram showing a configuration example of the center apparatus 5.

As shown in FIG. 2, the center apparatus 5 includes a transmission/reception unit 10, a control unit 11, a storage unit 12, an input unit 13, a display unit 14, and various types of databases 15 to 17.

The transmission/reception unit 10 transmits/receives various types of data such as real travel information and a congestion state, between the wireless base station 4 and the control unit 11.

The control unit 11 is implemented as an arithmetic processing device including a CPU (Central Processing Unit) that reads out a computer program 18 stored in the storage unit 12 and that performs information processing in accordance with the program 18.

The storage unit 12 includes a storage medium such as a hard disk and a semiconductor memory. The computer program 18 includes an application program that causes the control unit 11 to function as a device such as a traffic flow simulator 21 or a signal control device 22.

The input unit 13 is an input interface that allows a user to perform a predetermined input operation on the control unit 11. The input unit 13 includes a human interface such as a mouse and a keyboard, for example.

The display unit 14 is implemented as a display device such as a liquid crystal panel that allows screen display according to a GPU (graphic processing unit) of the control unit 11. The display unit 14 displays various types of images such as an operation window and a moving image in accordance with image processing according to the computer program 18.

[Contents of Databases]

A travel information database 15 is a database in which real travel information collected from a plurality of communication vehicles 1 is stored. FIG. 3 is a diagram showing a data configuration of real travel information stored in the travel information database 15.

As shown in the column "item" in FIG. 3, the information type of the real travel information includes "node information", "link information", "position information", "signal unit information", and the like.

The data content of the node information includes a number of effective data n of nodes (intersections) that have been passed or that are scheduled to be passed by each communication vehicle 1, and the node numbers thereof.

Every time the on-vehicle device 2 of the communication vehicle 1 passes an intersection, the on-vehicle device 2 causes the passing time thereof (in the unit of second) and the node number of the passed intersection, to be included in the real travel information.

The data content of the link information includes a number of effective data n of links that have been passed or scheduled to be passed by the communication vehicle 1, and the link numbers thereof.

Every time the on-vehicle device 2 of the communication vehicle 1 passes a traffic lane of a specific link, the on-vehicle device 2 causes the passing time, the link number, and the traffic lane number thereof, to be included in the real travel information.

The data content of the position information includes a number of pieces of information n of vehicle positions collected every predetermined time period or every predetermined distance, and the vehicle positions thereof (latitude/longitude).

Every time the on-vehicle device 2 of the communication vehicle 1 travels for a predetermined time period or a predetermined distance, the on-vehicle device 2 causes the current time, the vehicle position, vehicle information (vehicle type, full length, full width, etc.), the vehicle speed, and the absolute heading, to be included in the real travel information.

The data content of the signal unit information includes the number of pieces of signal unit information of traffic signal units obtained by the communication vehicle 1 from optical beacons (not shown) and other roadside devices, and detailed contents of the signal unit information.

The communication vehicle 1 causes the time at which the communication vehicle 1 passed the intersection, the phase, work mode number, and the like of the traffic signal unit at the time point of the passage, to be included in the real travel information. In a case where the real travel information is scheduled travel information, the signal unit information need not be included.

A travel environment database 16 is a database in which data (hereinafter, "map data") of a digital road map (DRM) is stored.

The map data includes data such as: positions (latitude and longitude) of links and nodes (intersections) that belong to a management area of the center apparatus 5; identification numbers thereof; the number of traffic lanes of each link; and the like. The travel environment database 16 also includes signal information (e.g., signal light color for each time period) of a signal unit installed at each intersection.

A parameter database 17 is a database in which various types of parameters necessary for traffic flow simulation are stored.

The parameters include: an OD table (matrix) that defines a generation traffic volume and a disappearance traffic volume for each of a departure zone and an arrival zone; an OD traffic volume between zones calculated for each cell of the OD table; a vehicle speed at each link (e.g., speed limit); and the like. Among these, the OD traffic volume is recorded for each predetermined time frame.

FIG. 4 is a traffic volume table showing an example of the OD traffic volumes in a predetermined time frame.

In the traffic volume table shown in FIG. 4, traffic volumes when the origins/destinations are cells A1, A5, A6, A10, and A12 in the OD table are specified.

Specifically, as the traffic volume in a predetermined time period, there are 40 vehicles having an origin of cell A1 and having a destination of cell A5. In addition, as the traffic volume, there are 150 vehicles having an origin of cell A10 and having a destination of cell A5. The other cases are indicated in the same manner. The numbers of vehicles are not limited to those shown in FIG. 4.

[Function of Center Apparatus]

The control unit 11 of the center apparatus 5 can function as the traffic flow simulator 21, by executing the computer program 18 read out from the storage unit 12.

The traffic flow simulator 21 is a device that causes a plurality of simulation vehicles SV to tentatively travel in a road network formed as a link network included in a predetermined area (e.g., one prefecture, city, state, or the like) in a digital map, and outputs a traffic evaluation index such as a link trip time period and a congestion length.

The traffic flow simulator 21 reads out data necessary for simulation, from the databases 15 to 17, and executes traffic flow simulation related to passage of vehicles.

In the present embodiment, when a predetermined setting input of an area, a time frame, a restricted section, a congestion section, and the like for which simulation is to be performed, is performed through an input operation to the input unit 13 by the user, the traffic flow simulator 21 executes simulation in accordance with the set condition.

Specifically, the traffic flow simulator 21 reads out OD tables and OD traffic volumes of a plurality of zones included in the set area, calculates a behavior of each vehicle for each lapse of a predetermined time period by using an algorithm based on a predetermined distribution traffic volume model, and displays the behavior as an animation for the road network, on the display unit 14.

The control unit 11 of the center apparatus 5 executes the computer program 18 read out from the storage unit 12, thereby being able to function also as the signal control device 22 that controls a plurality of traffic signal controllers.

Therefore, the transmission/reception unit 10 of the center apparatus 5 is also communicably connected via the communication line 6, to vehicle detectors and the traffic signal controllers (not shown) in the management area.

The signal control device 22 performs traffic actuated control such as coordinated control and wide-area control on the basis of detection signals of the vehicle detectors received by the transmission/reception unit 10, and transmits, from the transmission/reception unit 10 to the traffic signal controllers, signal control parameters for intersections generated as a result of the control.

The above-described traffic actuated control includes a plurality of types of controls including, for example, a MODERATO control, a profile control, and the like.

At each predetermined cycle (e.g., one minute), the signal control device 22 transmits, to the traffic signal controller, signal control commands, which are each an output being a result of the traffic actuated control and which are each for a light color switching timing or the like of a signal light unit performed every predetermined time period.

[Configuration Example of Traffic Flow Simulator]

Figure 5:
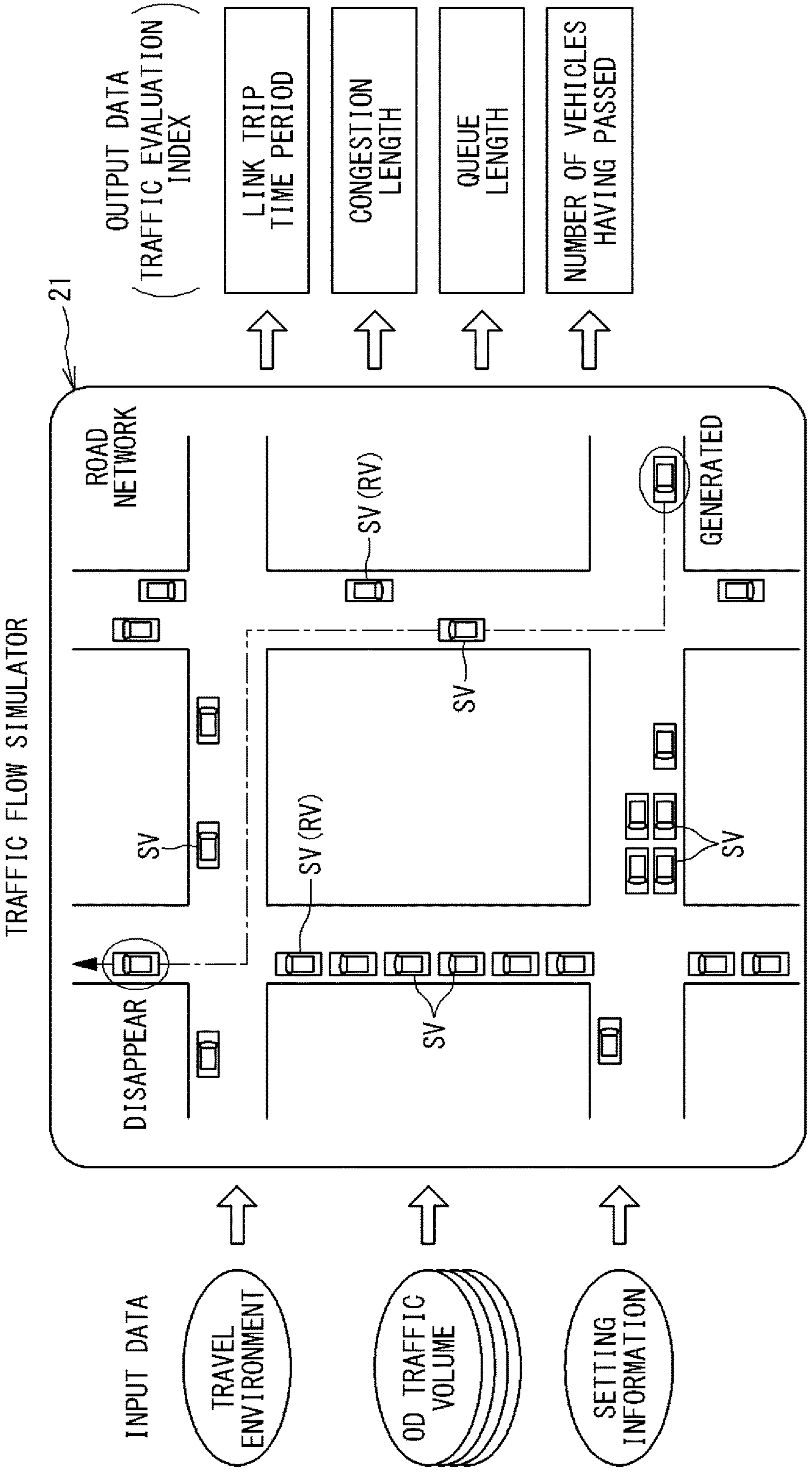
FIG. 5 illustrates an example of information processing performed by a traffic flow simulator.

FIG. 5 illustrates an example of information processing performed by the traffic flow simulator 21. As shown in FIG. 5, input data of the traffic flow simulator 21 includes: a travel environment such as a road network in a predetermined area; an OD traffic volume in a predetermined time frame; and setting information such as a position of a sporadically-occurring congestion or a traffic regulation intentionally set by the user.

Output data (traffic evaluation index) of the traffic flow simulator 21 includes at least one of a link trip time period, a congestion length, a queue length, and the number of vehicles having passed a link.

The traffic flow simulator 21 generates a plurality of simulation vehicles SV from a plurality of departure points, and causes each simulation vehicle SV to disappear at a time point when the simulation vehicle SV has reached a destination point.

At this time, the traffic flow simulator 21 generates a traffic flow on a road network composed of time series data of the vehicle position of each predetermined control cycle (e.g., 0.1 to 1.0 seconds), and on the basis of the generated traffic flow, calculates a traffic evaluation index such as a trip time period, a congestion length, or a queue length of each road section (link).

The traffic flow simulator 21 can designate some of the plurality of simulation vehicles SV generated in the road network, as vehicles (hereinafter, referred to as "real travelling vehicles RV") that correspond to communication vehicles 1 of which routes are known from the real travel information.

For example, in a case where real travel information of three communication vehicles 1 of which the origin passes cell A1 in FIG. 4 and of which the destination passes cell A5 in FIG. 4 exists in the travel information database 15, the three vehicles in 40 vehicles corresponding to A1/A5 may be designated as the real travelling vehicles RV.

Figure 6:
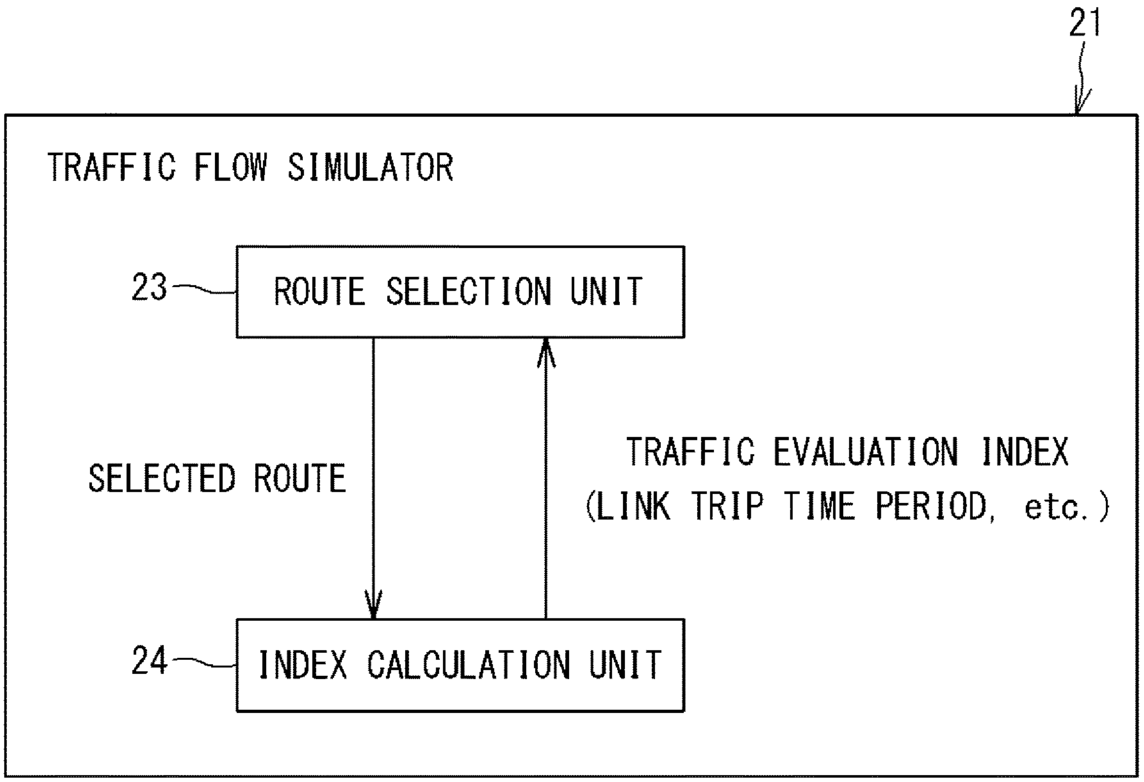
FIG. 6 is a block diagram showing a configuration example of the traffic flow simulator.

FIG. 6 is a block diagram showing a configuration example of the traffic flow simulator 21.

As shown in FIG. 6, the traffic flow simulator 21 includes: a route selection unit 23 which selects a route for each simulation vehicle SV at each control cycle; and an index calculation unit 24 which calculates a predetermined traffic evaluation index such as a link trip time period at each control cycle.

The route selection unit 23 executes, at each control cycle, a process of selecting a route for each simulation vehicle SV in accordance with a predetermined route selection model.

The route selection unit 23 executes route selection for each simulation vehicle SV by using a traffic evaluation index (e.g., link trip time period) sequentially inputted from the index calculation unit 24. At each control cycle, the route selection unit 23 outputs, to the index calculation unit 24, the selected route for each simulation vehicle SV.

As the route selection model for the simulation vehicle SV, a model that selects a route for which a route calculation index defined by the following calculation formula becomes minimum may be adopted, for example.

Route calculation index (seconds)=travel distance/speed limit+weighting factor×travel time period+fee×time factor When the simulation vehicle SV is a real travelling vehicle RV, the route selection unit 23 adopts the route, as is, based on the real travel information.

Specifically, when the real travel information is actually-performed travel information (probe data), the route selection unit 23 adopts an actually-traveled route specified from the information. When the real travel information is scheduled travel information, the route selection unit 23 adopts a scheduled route specified from the information.

The index calculation unit 24 causes each simulation vehicle SV to move on the road network in accordance with route information sequentially inputted from the route selection unit 23. In addition, the index calculation unit 24 causes each simulation vehicle SV to move on the road network in accordance with a predetermined vehicle behavior model.

Every time the index calculation unit 24 causes each simulation vehicle SV to move on the road network, the index calculation unit 24 calculates a traffic evaluation index such as a link trip time period at each time point. The index calculation unit 24 outputs, to the route selection unit 23, the calculated traffic evaluation index such as the link trip time period.

As the vehicle behavior model of the simulation vehicle SV, various models may be adopted. However, it is preferable to adopt a model that represents the behavior on the basis of, for example, the distance between a preceding vehicle and a following vehicle, and acceleration/deceleration of the simulation vehicle SV determined from the speeds of the preceding vehicle and the following vehicle.

In this case, prolongation or disappearance of congestion, acceleration/deceleration of each simulation vehicle SV, and the like can be expressed on the road network.

[Work Mode of Traffic Flow Simulator]

Figure 7:
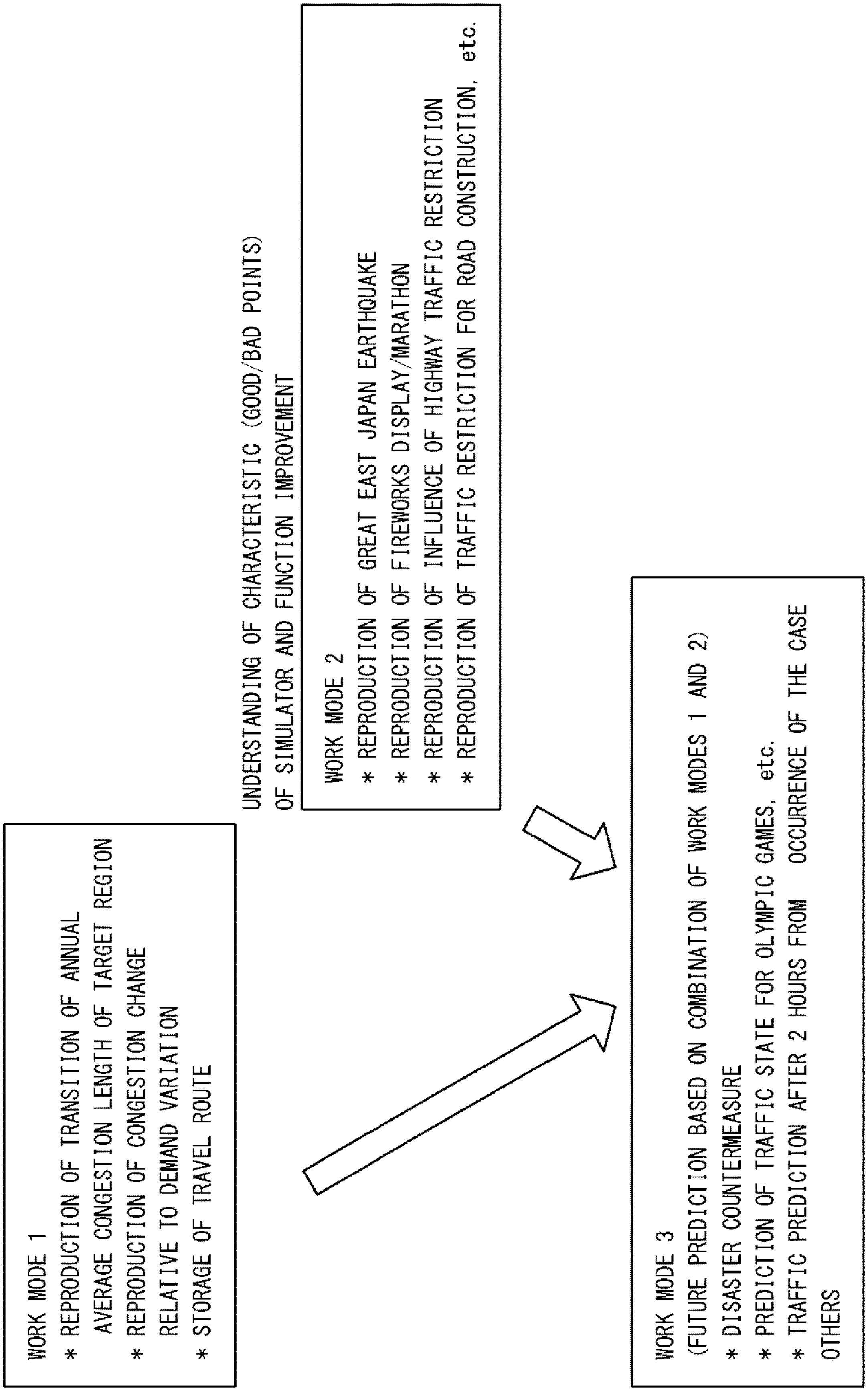
FIG. 7 illustrates an example of work modes of the traffic flow simulator.

FIG. 7 illustrates an example of work modes of the traffic flow simulator 21.

As shown in FIG. 7, the work modes that can be executed by the user by use of the traffic flow simulator 21 include three types of work modes 1 to 3 below.

The user can input one of the work modes 1 to 3 to the input unit 13. When an input operation of the work mode 1 to 3 has been made, the traffic flow simulator 21 records, into the storage unit 12, the identification number of the inputted work mode 1 to 3.

(Work Mode 1: Current State Reproduction)

The work mode 1 is a work mode in which the traffic flow simulator 21 is caused to operate in order to reproduce a traffic state on a past normal day, according to a specific day, an annual average, a day type, or the like.

The traffic flow simulator 21 of the present embodiment has a function of performing a "traffic flow correction process" (FIG. 7) described later. In the work mode 1, the traffic flow correction process is executed.

In the traffic flow correction process, the number of simulation vehicles SV on the road network is adjusted such that the result (congestion length and traffic volume) of the traffic flow simulation matches an actual result.

(Work Mode 2: Past Event Reproduction)

The work mode 2 is a work mode in which the traffic flow simulator 21 is caused to operate while using, as setting information, a traffic restriction (road blockage, traffic lane restriction, etc.) actually made at occurrence of a big past event (e.g., The Great East Japan Earthquake, fireworks display, marathon, serious traffic accident, etc.).

Therefore, when the work mode 2 is executed, it is possible to confirm whether or not the traffic flow simulator 21 can reproduce a traffic state, even under the state of an event that occurred in the past.

Even when the current state has been reproduced in the work mode 1, it is not ensured that a traffic state at occurrence of a certain event can be correctly predicted. Such a traffic state may be similar to or different from (may not match) the prediction.

Therefore, in the work mode 2, in order to enable substantial reproduction of a past event, common adjustment (e.g., adjustment of the vehicle behavior model and the route selection model) is performed, and characteristics of the traffic flow simulator 21 (e.g., although prediction performance regarding case C1 is high, prediction performance regarding case C2 is low; there is a specific tendency; etc.) can be grasped.

(Work Mode 3: Future Event Prediction)

The work mode 3 is a work mode in which a future traffic state is predicted with use of the simulation result of the work mode 1 and the simulation result of the work mode 2.

For appropriateness of prediction, accuracy of the scenario is more important than the performance of the traffic flow simulator 21. That is, it is important to accurately set what change in the traffic condition (change in demand, change in vehicle behavior, etc.) will occur.

Therefore, if the traffic flow simulator 21 for which the vehicle behavior model and the like have been appropriately adjusted through the work mode 1 and the work mode 2 is caused to operate in the work mode 3 on the basis of various conceivable scenarios, it is possible to predict a traffic state in consideration of an event that could occur in the future.

[Outline of Traffic Flow Correction Process]

Figure 8:
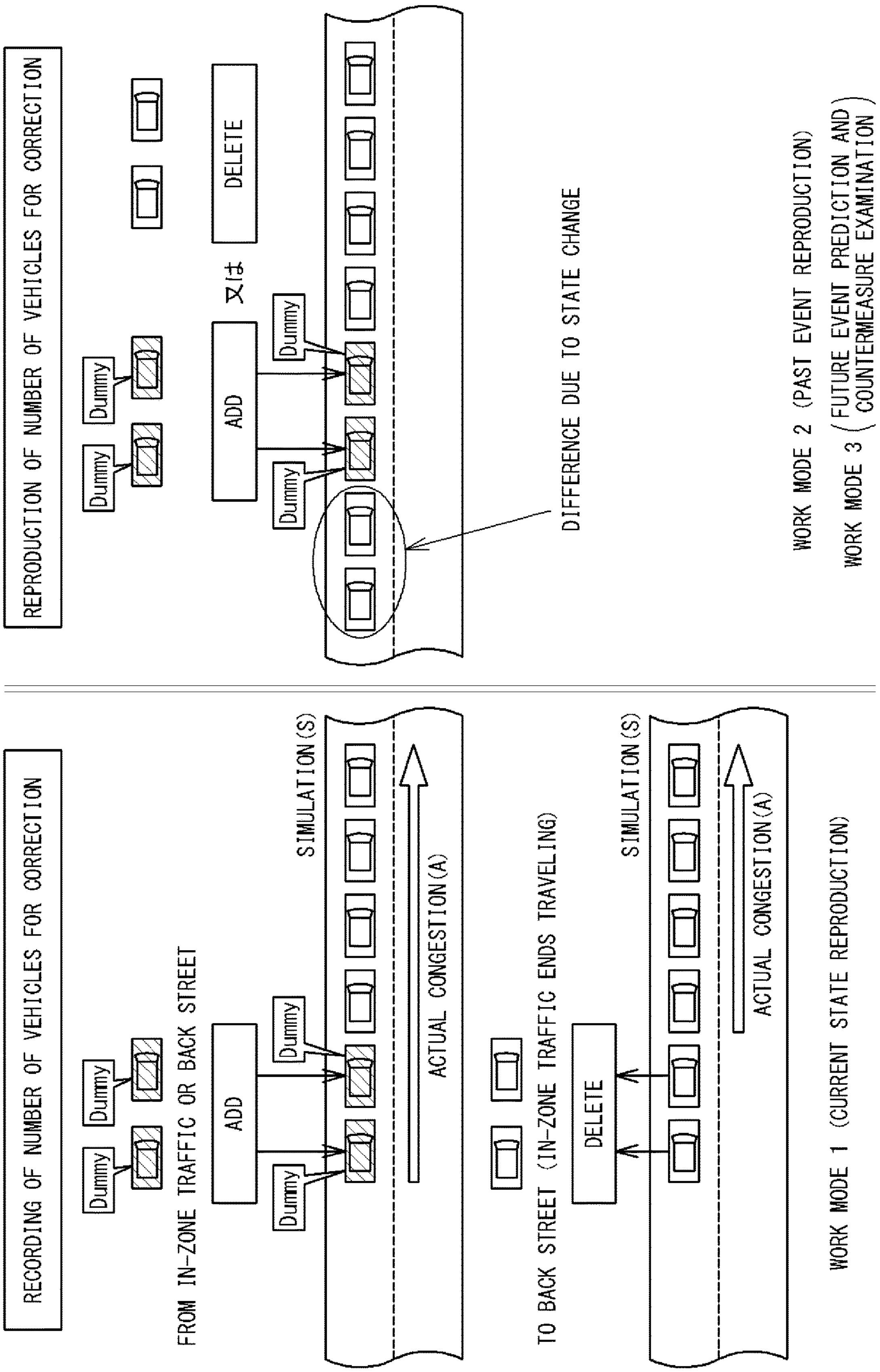
FIG. 8 illustrates an outline of a traffic flow correction process performed by the traffic flow simulator.

FIG. 8 illustrates an outline of the traffic flow correction process performed by the traffic flow simulator 21.

As shown in FIG. 8, in the work mode 1 (current state reproduction), the traffic flow simulator 21 compares, every predetermined time period, a simulation output S with actual congestion data A measured by a traffic control center (not shown).

When A>S, the traffic flow simulator 21 adds "dummy vehicles DV" to the link to match the simulation output S to the actual congestion data A.

When A<S, the traffic flow simulator 21 deletes "simulation vehicles SV" from the link to match the simulation output S to the actual congestion data A.

The number of added dummy vehicles DV and the number of deleted simulation vehicles SV are temporarily recorded in a predetermined region of the storage unit 12.

The recorded number of vehicles having been added or deleted are added or deleted in the work mode 2 (past event reproduction) or the work mode 3 (future event prediction) in synchronization with the case in the work mode 1.

Simulation vehicles SV of which the routes have been changed due to a predetermined event cause increase in the traffic volume (in an opposite case, decrease in the traffic volume) in a link on a new route, which appears as congestion changes in the work modes 2 and 3. Differences in evaluation values such as crowdedness, trip time period, and carbon dioxide emission can be compared as relative values with respect to the work mode 1.

[Route Selection Process for Each Simulation Vehicle]

Figure 9:
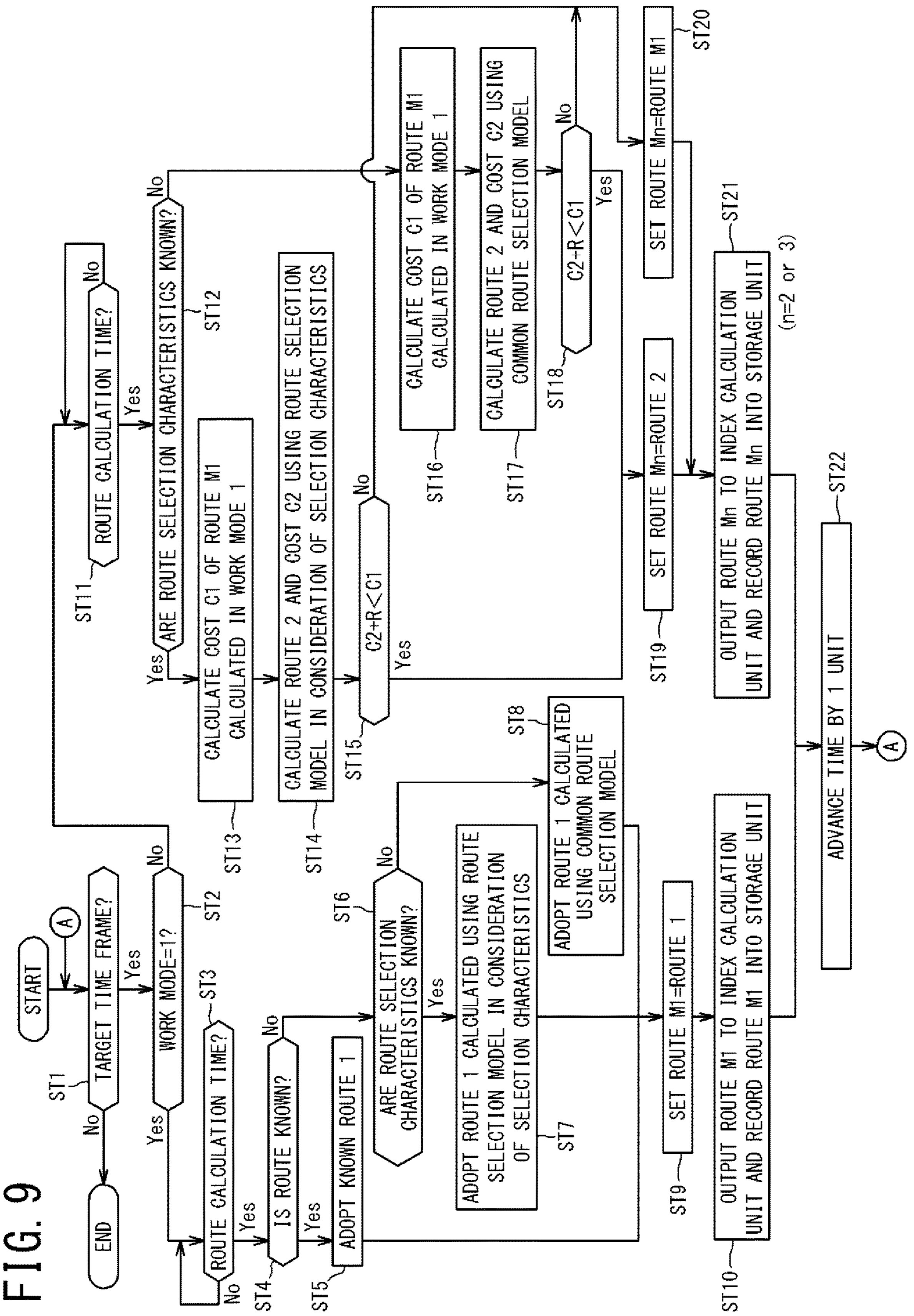
FIG. 9 is a flow chart showing an example of a route selection process for each simulation vehicle executed by a route selection unit of the traffic flow simulator.

FIG. 9 is a flow chart showing an example of a route selection process for each simulation vehicle SV executed by the route selection unit 23.

The route selection unit 23 of the traffic flow simulator 21 executes the process of the flow chart shown in FIG. 9 for each simulation vehicle SV present in the road network. However, when dummy vehicles DV have been generated due to the above-described traffic flow correction process (FIG. 8), the dummy vehicles DV are also subjected to the route selection process, and are considered as simulation vehicles SV of which the routes and selection characteristics are unknown.

As shown in FIG. 9, the route selection unit 23 determines whether or not the current time is included in a target time frame (step ST1). The target time frame refers to an imaginary time frame (e.g., 7:00 to 19:00) in which the traffic flow simulation is performed.

When the determination result in step ST1 is negative, the route selection unit 23 ends the process.

When the determination result in step ST1 is positive, the route selection unit 23 determines whether or not the value of the work mode recorded in the storage unit 12 is "1" (step ST2).

That the determination result in step ST2 is positive means that the first simulation is to be performed. In this case, the route selection unit 23 waits until the route calculation time for this simulation arrives (Yes in step ST3), and then, determines whether or not the route of the simulation vehicle SV is known (step ST4).

That the route is known means that a route based on the real travel information exists, i.e., that the simulation vehicle SV is designated as the above-described real travelling vehicle RV.

When the determination result in step ST4 is positive, the route selection unit 23 does not execute calculation based on the route selection model, and adopts a known route 1 as the route for the simulation vehicle SV (step ST5).

Then, the route selection unit 23 sets a route M1 to the route 1 (step ST9), and then, outputs the route M1 to the index calculation unit 24 and records the route M1 into the storage unit 12 (step ST10). The route M1 means a route in the work mode 1 of the simulation vehicle SV When the determination result in step ST4 is negative, the route selection unit 23 determines whether or not route selection characteristics of the simulation vehicle SV are known (step ST6).

The selection characteristics mean personal selection characteristics that can be set in advance, such as disliking selection of back streets and narrow streets, liking routes having fewer right/left turns, and avoiding toll roads.

When the determination result in step ST6 is positive, the route selection unit 23 adopts, as the route for the simulation vehicle SV, a route 1 calculated by using the route selection model in consideration of the selection characteristics (step ST7).

Then, the route selection unit 23 sets the route M1 to the route 1 (step ST9), and then, outputs the route M1 to the index calculation unit 24 and records the route M1 into the storage unit 12 (step ST10).

When the determination result in step ST6 is negative, the route selection unit 23 adopts, as the route for the simulation vehicle SV, a route 1 calculated by using a common route selection model (step ST8).

The common route selection model is a model defined by, for example, the calculation formula of "route calculation index (seconds)=travel distance/speed limit+weighting factor×travel time period+fee×time factor".

Then, the route selection unit 23 sets the route M1 to the route 1 (step ST9), and then, outputs the route M1 to the index calculation unit 24 and records the route M1 into the storage unit 12 (step ST10).

When the process of step ST10 is completed, the route selection unit 23 advances the time by 1 unit (e.g., by the same seconds as the control cycle) (step ST22), and then, returns the process to before step ST1.

When the determination result in step ST2 is negative, the work mode of the traffic flow simulator 21 is "2" or "3", which means that the second simulation and thereafter are to be performed.

In this case, the route selection unit 23 waits until the route calculation time for this simulation arrives (Yes in step ST11), and then, determines whether or not route selection characteristics of the simulation vehicle SV are known (step ST12).

When the determination result in step ST12 is positive, the route selection unit 23 first calculates a cost C1 of the route M1 calculated in the work mode 1 (step ST13).

The cost C1 in this case is provided by a formula obtained by adding an index value of a personal characteristic to the common formula of "route calculation index (seconds) =travel distance/speed limit+weighting factor×travel time period+fee×time factor".

For example, the following processes are conceivable: when selection of back streets and narrow streets is disliked, a weighting factor for the travel time period of a back street is set to be large; when routes having fewer right/left turns are liked, a certain numerical value is added for each right/left turn; and the like.

Next, the route selection unit 23 calculates a route 2 and a cost C2 thereof under a setting condition of a work mode n (n=2 or 3) according to the route selection model in consideration of the selection characteristics (step ST14). The calculation method for the cost C2 is similar to that for the cost C1. The route 2 is a route that enables the cost C2 to be lowest.

Then, the route selection unit 23 determines whether or not an inequality of $C2+R<C1$ is established (step ST15).

R is an index representing an adherence degree to the route M1 of the work mode 1. It is when a new route has a worth of a certain level or higher that a driver changes a scheduled route. Therefore, R is set to a value obtained by multiplying a predetermined value (e.g., 100 seconds) or C1 by a predetermined rate (e.g., 10%). R may be varied for each simulation vehicle SV in accordance with characteristics of the driver.

When the determination result in step ST15 is positive, the route selection unit 23 sets a route Mn to the route 2 (step ST19), and then, outputs the route Mn to the index calculation unit 24 and records the route Mn into the storage unit 12 (step ST21). The route Mn means a route in the work mode n (n=2 or 3) of the simulation vehicle SV.

When the determination result in step ST15 is negative, the route selection unit 23 sets the route Mn to the route M1 (step ST20), and then, outputs the route Mn to the index calculation unit 24 and records the route Mn into the storage unit 12 (step ST21).

When the determination result in step ST12 is negative, the route selection unit 23 first calculates a cost C1 of the route M1 calculated in the work mode 1 (step ST16).

The cost C1 in this case is provided by the common formula of "route calculation index (seconds)=travel distance/speed limit+weighting factor×travel time period+fee×time factor".

Next, the route selection unit 23 calculates a route 2 and a cost C2 thereof under a setting condition of a work mode n (n=2 or 3) according to the common route selection model (step ST17). The calculation method for the cost C2 is similar to that for the cost C1. The route 2 is a route that enables the cost C2 to be lowest.

Then, the route selection unit 23 determines whether or not an inequality of $C2+R<C1$ is established (step ST18). R is an index representing an adherence degree to the route M1 of the work mode 1.

When the determination result of step ST18 is positive, the route selection unit 23 sets the route Mn to the route 2 (step ST19), and then, outputs the route Mn to the index calculation unit 24 and records the route Mn into the storage unit 12 (step ST21).

When the determination result of step ST18 is negative, the route selection unit 23 sets the route Mn to the route M1 (step ST20), and then, outputs the route Mn to the index calculation unit 24 and records the route Mn into the storage unit 12 (step ST21).

When the process of step ST21 is completed, the route selection unit 23 advances the time by 1 unit (e.g., by the same seconds as the control cycle) (step ST22), and then, returns the process to before step ST1.

[Effect of Traffic Flow Simulator]

As described above, according to the traffic flow simulator 21 of the present embodiment, the routes M1, Mn (specifically, the link number and the flow-in time and flow-out time of the link) of all the simulation vehicles SV selected in each of the work modes 1 to 3 are recorded into the storage unit 12 (steps ST10, ST21 in FIG. 9).

Therefore, when the user contrasts the recorded route M1 and route Mn with each other, the user can determine whether or not the route selection model can be used in each setting condition, and thus, the user can verify effectiveness of the route selection model incorporated in the traffic flow simulator 21.

According to the traffic flow simulator 21 of the present embodiment, when the inequality of $C2+R<C1$ is established, the route calculated according to the route selection model in the work mode n is set as the route Mn (step ST19 in FIG. 9), and when the inequality is not established, the work mode route M1 is set as the route Mn (step ST20 in FIG. 9).

Therefore, in accordance with the value of the adherence rate R, the degree at which the simulation vehicle SV changes the route in the work mode n can be appropriately adjusted. Thus, simulation accuracy of the work mode n can be improved.

According to the traffic flow simulator 21 of the present embodiment, when a real travelling vehicle RV is included in the simulation vehicles SV, the traffic flow simulator 21 adopts, in the work mode 1, with respect to a simulation vehicle SV designated as the real travelling vehicle RV, the travel route without performing route selection based on the route selection model (step ST5 in FIG. 9).

Therefore, the actual travel route is included in the routes of simulation vehicles SV used in the work mode 1, and thus, simulation accuracy of the work mode 1 can be improved.

The above-described embodiment is merely illustrative and not restrictive in all aspects. All changes which come within the scope of equivalency of configurations recited in the claims are included in the scope of the present disclosure.

REFERENCE SIGNS LIST

1 communication vehicle
2 on-vehicle device
3 communication device
4 wireless base station
5 center apparatus
6 communication line
10 transmission/reception unit
11 control unit
12 storage unit
13 input unit
14 display unit
15 travel information database
16 travel environment database
17 parameter database
18 computer program
21 traffic flow simulator
22 signal control device
23 route selection unit
24 index calculation unit

The invention claimed is:

1. A traffic flow simulator configured to simulate a traffic flow of a plurality of simulation vehicles generated in a road network, the traffic flow simulator comprising:

a route selection unit configured to select a route for each of a plurality of the simulation vehicles in accordance with a predetermined route selection model; and an index calculation unit configured to calculate a traffic evaluation index of the road network by causing each of a plurality of the simulation vehicles to move on the road network in accordance with the route, wherein when a work mode designated by a user is a first mode below, the route selection unit records, into a storage unit, a first route being a route for each of the plurality of simulation vehicles in the first mode, and when a work mode designated by the user is an n-th mode below (n≥2), the route selection unit selects, as an n-th route being a route for each of the plurality of simulation vehicles in the n-th mode, the first route under a condition that an inequality below is not established or a second route under a condition that inequality below is established, and records the n-th route selected as such into the storage unit, the first mode being a work mode in which the traffic flow is simulated under a first setting condition, the n-th mode being a work mode in which the traffic flow is simulated under an n-th setting condition, $$C2+R<C1,$$

where

C1 is a cost of the first route calculated under a setting condition in the first mode, C2 is a cost of the second route calculated under a setting condition in the n-th mode, and R is an adherence rate to the first route.

2. The traffic flow simulator according to claim 1, wherein the first mode is a first work mode for current state reproduction, and the n-th mode is a second work mode for past event reproduction or a third work mode for future event prediction.

3. The traffic flow simulator according to claim 2, wherein the first work mode is a work mode for adjusting a number of the plurality of the simulation vehicles such that a result of a traffic flow simulation matches an actual result, the second work mode is a work mode for using, as setting information, a traffic restriction made at occurrence of a past event, the third work mode is a work mode for predicting a future traffic state using a simulation result of the first work mode and a simulation result of the second work mode.

4. The traffic flow simulator according to claim 1, further comprising the storage unit configured to store the first route and the n-th route.

5. The traffic flow simulator according to claim 1, wherein when a real travelling vehicle of which an actual travel route is able to be specified is included in the simulation vehicles, in the first mode, with respect to a simulation vehicle designated as the real travelling vehicle, the route selection unit adopts the travel route without performing the selection of the route based on the route selection model.

6. The traffic flow simulator according to claim 1, wherein the first route and n-th route stored in the storage unit comprise:

a number of a link through which the plurality of the simulation vehicles has passed; and a flow-in time and a flow-out time of the link.

7. A method for simulating a traffic flow of a plurality of simulation vehicles generated in a road network, the method comprising:

a selection step of selecting a route for each of a plurality of the simulation vehicles in accordance with a predetermined route selection model; and a calculation step of calculating a traffic evaluation index of the road network by causing each of a plurality of the simulation vehicles to move on the road network in accordance with the route, wherein the selection step includes the steps of:

when a work mode designated by a user is a first mode below, recording, into a storage unit, a first route being a route for each of the plurality of simulation vehicles in the first mode; and when a work mode designated by the user is an n-th mode below (n≥2), selecting, as an n-th route being a route for each of the plurality of simulation vehicles in the n-th mode, the first route under a condition that an inequality below is not established or a second route under a condition that the inequality below is established, and recording the n-th mode selected as such into the storage unit;

the first mode being a work mode in which the traffic flow is simulated under a first setting condition, the n-th mode being a work mode in which the traffic flow is simulated under an n-th setting condition, $$C2+R<C1,$$

where

C1 is a cost of the first route calculated under a setting condition in the first mode, C2 is a cost of the second route calculated under a setting condition in the n-th mode, and R is an adherence rate to the first route.

8. A non-transitory computer readable storage medium storing a computer program configured to cause a computer to function as a traffic simulator, the traffic simulator being configured to simulate a traffic flow of a plurality of simulation vehicles generated in a road network, the computer program being configured to cause the computer to function as:

a route selection unit configured to select a route for each of a plurality of the simulation vehicles in accordance with a predetermined route selection model; and an index calculation unit configured to calculate a traffic evaluation index of the road network by causing each of the simulation vehicles to move on the road network in accordance with the route, wherein when a work mode designated by a user is a first mode below, the route selection unit records, into a storage unit, a first route being a route for each of the plurality of simulation vehicles in the first mode, and when a work mode designated by the user is an n-th mode below (n≥2), the route selection unit selects, as an n-th route being a route for each of the plurality of simulation vehicles in the n-th mode, the first route under a condition that an inequality below is not established or a second route under a condition that inequality below is established, and records the n-th route selected as such into the storage unit, the first mode being a work mode in which the traffic flow is simulated under a first setting condition, the n-th mode being a work mode in which the traffic flow is simulated under an n-th setting condition, $$C2+R<C1,$$

where

C1 is a cost of the first route calculated under a setting condition in the first mode, C2 is a cost of the second route calculated under a setting condition in the n-th mode, and R is an adherence rate to the first route.

* * * * *